J. MILLER,
Harvester-Rake.

No. 8,119. Reissued March 12, 1878.

*Witnesses:*

John Everding

W. C. Strawbridge

*Inventor:*

Jacob Miller

N. PETERS, PHOTO-LITHOGRAPHER, WASHINGTON, D. C.

BEST AVAILABLE COPY

UNITED STATES PATENT OFFICE.

JACOB MILLER, OF CANTON, OHIO.

IMPROVEMENT IN HARVESTER-RAKES.

Specification forming part of Letters Patent No. 66,609, dated July 9, 1867; Reissue No. 8,119, dated March 12, 1878; application filed March 14, 1877.

*To all whom it may concern:*

Be it known that I, JACOB MILLER, of Canton, in the county of Stark and State of Ohio, have invented certain new and useful Improvements in Raking Attachments for Harvesters; and I do hereby declare the following to be a full, clear, and exact description of the construction and operation of the same, reference being had to the accompanying drawings, making a part of this specification, in which—

Figure 1:
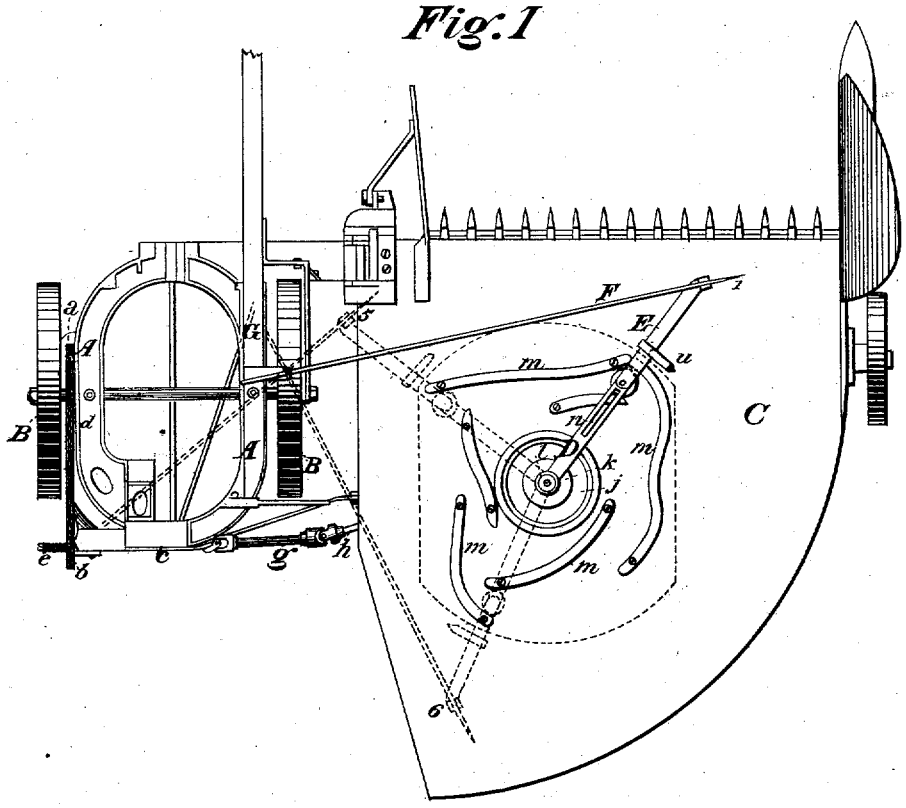
Figure 2:
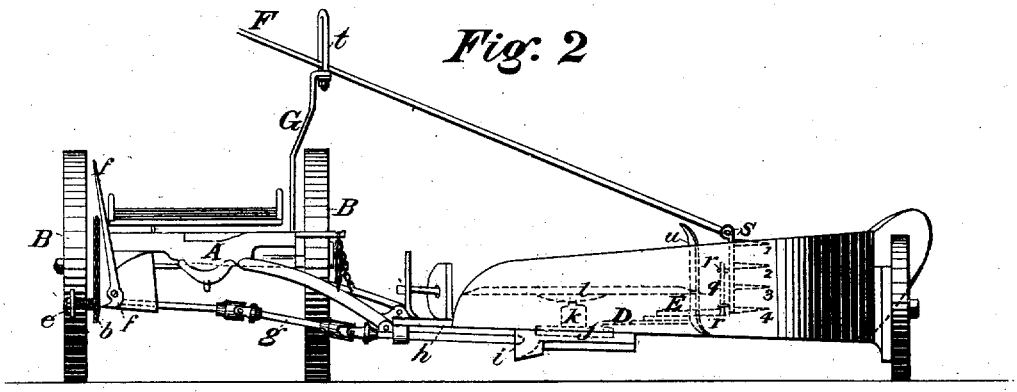

Figure 1 represents a top plan of a harvesting-machine with the raking attachment applied thereto, the shield or secondary platform being removed to show the parts underneath it. Fig. 2 represents a rear elevation of the machine.

Similar letters of reference, where they occur in the separate figures, denote like parts of the machine in both of the drawings.

This invention consists, first, in the arrangement of a fork, attached to an arm or sweep-rod that slides in a swivel-post placed on the inner side of the machine, and driven from the main wheels, for giving said fork or rake its proper motion in connection with a cam path or track on the platform.

It further consists in a post or tang placed on the driving-arm, for the purpose of guarding the end of the teeth, and of assisting the fork or rake in moving the grain off the grain table or platform.

It further consists in the combination of a quadrant-platform, a table-rake adapted to collect the cut grain in gavels suitable for tying, and mechanism controlling said rake and moving it at intervals, with its load, outward against the divider and around to the delivery-point.

It also consists in arranging the swivel-post on the inner side of the platform.

It further consists in the combination of a quadrant-platform, a rake adapted to collect the cut grain in gavels suitable for tying, mechanism for imparting to said rake, with its load, a motion outward against the divider, backward and around to the delivery-point of the platform, and mechanism controlling the rake-teeth, and causing them, at the moment of withdrawing from the gavel, to assume a position practically parallel with the path of the machine and athwart the gavel.

It further consists in combining a table-rake moving from the inner to the outer side of the platform with an outer grain-board so arranged as to present no obstacle in the path of the cut grain.

It further consists in the combination of a quadrant-platform, a rake adapted to collect the cut grain in gavels suitable for tying, and mechanism controlling said rake and causing it to approach and enter the cut grain from and through the open space on the platform between the driving-wheel and the falling grain, and to sweep the same from the inner toward the outer side of the platform, compressing it against the divider-board in bundles, then moving it around to the delivery-point of the platform.

It further consists in so arranging the driving-arm of the rake that the teeth of the fork, in withdrawing from the gavel and moving forward, may pass over the driving-arm.

To enable others to make and use my invention, I will proceed to describe the same with reference to the drawings.

The frame A is made of cast-iron, by preference, and supported on the two wheels B B, one or both of which may be driving-wheels.

Connected to the driving-wheel there is a sprocket-wheel, *a*, around which and around a smaller sprocket, *b*, on the shaft *c*, passes an endless driving-chain, *d*.

The small sprocket *b* is held in clutch with its shaft *c* by a spring, *e*; and when it is desired to stop the action of the rake while the machine continues to advance, a lever, *f*, is forced against said wheel *b*, and, moving it away from its clutch, it will turn on the shaft instead of turning the shaft, and the rake, of course, ceases to move.

The shaft *c* is connected, through a toggle-jointed link, *g*, to a shaft, *k*, underneath the platform C; and on the end of this shaft *h* there is a bevel-pinion, *i*, that works in a bevel-gear on the under side of a disk, *j*, whose hub *k* sets over a rigid pin or journal, *l*, extending up through and above the platform far enough to form a permanent and rigid support for the supplemental grain-table, (shown in the figures,) which covers the cam-path or ledges *m* on the main platform C.

There is connected to the disk *j* an arm, D, which, of course, revolves with said disk, and this arm is slotted, as at *n*, so that a pin, *o*, passing through another arm, E, lying and working on top of the arm D, and through said slot, may move in it, as it in turn is moved by a friction-roller, *p*, on its lower end, taking against the camways or ledges *m* on the platform C. To a post, *q*, on the end of the upper arm E, is pivoted, by lugs *r r*, the rake or fork head S, which carries the teeth 1 2 3, which are stationary in the head, and a lower one, 4, which is hinged in the said head, so that it may move closely to the platform, and then rise up to pass over the arm E, which it does just previous to entering the grain to remove it from the platform.

To the top of the rake or fork head *s* there is pivoted a sweep-rod, F, the interior end of which passes through a swivel-head, *t*, on top of a post, G, set on the main frame A of the machine. This swivel-head accommodates itself to the varied positions of the sweep-rod as it is carried around at its outer end by the fork, and also aids to steady the fork in its movements.

The positions of the arm, fork, and sweep-rod are shown by dotted lines in Fig. 1, when the fork is at those points. The positions at 5 show the fork just ready to enter the grain preparatory to sweeping it off the platform. The dotted lines show the relative positions of the several parts when at that point; and at 6 they are again shown in their relative positions in dotted lines, and in the act of delivering the gavel from the platform onto the ground.

On the arm D, at its extreme outer end, there is a post or tang, *u*, which serves as a guard for the teeth of the fork or rake, and also aids in delivering or moving the grain off from the platform, it having a foot, *v*, that moves close to the platform.

The secondary or auxiliary grain-table protects the roller on the driving-arm, as also the cam-ledges, from being choked or stopped by the falling grain, and also serves to hold up the falling grain, in part, so that the fork may more readily take it.

Having thus fully described my invention, what I claim as new, and desire to secure by Letters Patent, is—

1. The combination of a quadrant-platform, a table-rake adapted to collect the cut grain in gavels suitable for tying, and mechanism controlling said rake and moving it at intervals, with its load, outward against the divider and around to the delivery-point.

2. In a harvester, a mechanism to give motion to a rake placed centrally upon the platform, around which the rake-teeth revolve, in combination with a swivel-post placed on the inner side of the platform, substantially as shown and described.

3. The combination of a quadrant-platform, a rake adapted to collect the cut grain in gavels suitable for tying, mechanism for imparting to said rake, with its load, a motion outward against the divider, backward, and around to the delivery-point of the platform, and mechanism controlling the rake-teeth, and causing them, at the moment of withdrawing from the gavel, to assume a position practically parallel with the path of the machine and athwart the gavel.

4. In a harvester, in combination with a rake moving grain outward, compressing it against the divider-board in bundles, then moving backward and around, delivering it at the side of the path of the machine on its next round, an outer grain-board so arranged as to present no obstacle in the path of removal of the cut grain, substantially as shown and described.

5. The combination of a quadrant-platform, a rake adapted to collect the cut grain in gavels suitable for tying, and mechanism controlling said rake and causing it to approach and enter the cut grain from and through the open space on the platform between the driving-wheel and the falling grain, and to sweep the same from the inner toward the outer side of the platform, compressing it against the divider-board in bunches, then moving it around to the delivery-point of the platform.

6. The combination of swivel-post, the sweep-rod, fork, and driving-arm with the cam-ledges, for giving said fork its projecting and retreating motions in connection with its revolving motion, substantially as described.

7. In combination with the fork, the post or tang on the driving-arm, for guarding the end of the teeth of the fork, and for aiding in moving the grain from the platform, substantially as described.

8. The combination of the driving-arm D, fork S, and sweep-arm F, so arranged that the teeth of the fork, in withdrawing from the gavel and moving forward to the point marked 5, will pass over the driving-arm, substantially as shown and described.

9. The combination of the sweep-arm F, driving-arm D, and fork S, when arranged so that the rake-teeth, in moving from the point of delivery of the gavel to the position marked 5, and in passing the minor drive-wheel, will point toward the outer or grain side of the machine, substantially as shown and described.

JACOB MILLER.

Witnesses:
J. H. SMITH,
JEFF. G. HAUSER.